United States Patent [19]

Hirt et al.

[11] 4,019,696
[45] Apr. 26, 1977

[54] METHOD OF AND APPARATUS FOR ENHANCING COANDA FLOW ATTACHMENT OVER A WING AND FLAP SURFACE

[75] Inventors: William J. Hirt, Bellevue; Charles A. Grotz, Seattle, both of Wash.

[73] Assignee: The Boeing Company, Seattle, Wash.

[22] Filed: Aug. 28, 1975

[21] Appl. No.: 608,667

Related U.S. Application Data

[63] Continuation of Ser. No. 429,657, Dec. 28, 1973, abandoned.

[52] U.S. Cl. ................. 244/42 CD; 244/40 A; 244/42 CC
[51] Int. Cl.[2] .......................... B64C 21/00
[58] Field of Search .......... 244/42 R, 42 CC, 42 D, 244/42 CD, 42 CH, 42 DB, 42 DA, 40 R, 40 A, 41, 130, 15

[56] References Cited

UNITED STATES PATENTS

| | | | |
|---|---|---|---|
| 2,740,596 | 4/1956 | Lee | 244/40 A |
| 2,800,291 | 7/1957 | Stephens | 244/41 |
| 2,991,961 | 7/1961 | Rogallo et al. | 244/12.1 |
| 3,018,983 | 1/1962 | Davidson | 244/15 |
| 3,578,264 | 5/1971 | Koethe | 244/41 |
| 3,837,601 | 9/1974 | Cole | 244/42 DB |

*Primary Examiner*—Stephen G. Kunin
*Assistant Examiner*—Barry L. Kelmachter
*Attorney, Agent, or Firm*—Christensen, O'Connor, Garrison & Havelka

[57] ABSTRACT

A method of enhancing Coanda flow attachment over a wing and flap surface of an upper surface blowing aircraft comprising the step of directing the jet exhaust flow or stream toward regions wherein the exhaust flow separates from the wing and flap surface so as to create an outward velocity component which prevents ambient air from flowing in and under the exhaust from the sides of the exhaust flow and causing such separation is disclosed. The method comprises the further step of creating vortices also having outward velocity components on the wing and flap surface. The outward velocity components of the vortices further increases the sidewise velocity component on the wing surface. In addition, the rotational velocity components of the vortices scrub the boundary layer air from the flap surface to further promote flow attachment. Apparatus suitable for carrying out the method and comprising a plurality of airfoil shaped vortex generating vanes located between the engine exhaust and the trailing edge of the flap is also disclosed. The vortex generating vanes direct the exhaust stream toward the separation regions and create the outward velocity component vortices.

14 Claims, 7 Drawing Figures

METHOD OF AND APPARATUS FOR ENHANCING COANDA FLOW ATTACHMENT OVER A WING AND FLAP SURFACE

This is a continuation of application Ser. No. 429,657, filed Dec. 28, 1973, now abandoned.

BACKGROUND OF THE INVENTION

This invention is directed to jet aircraft and more particularly to upper surface blowing jet aircraft.

In recent years attention has been directed to creating both military and commerical jet aircraft that have the capability of taking off and landing in short distances. It has been found that it is difficult to obtain the desired short take-off and landing benefits with conventional under-the-wing engine/airplane configurations. Thus, attention has been directed to other methods of and apparatus for obtaining the desired results. One such method and apparatus utilizes augmentor wings and a directed air flow to augment the lifting capability of the wings. Another approach has been to utilize upper surface blowing techniques. This invention is directed toward aircraft using upper surface blowing techniques.

An upper surface blowing aircraft wherein jet engines are mounted above and forward of the longitudinal axis of the wings so that the jet exhaust travels across the upper surface of the wings and flaps, forming the trailing edge of the wings. This arrangement is contrary to more classical jet engine/wing arrangements wherein the engines are "hung" beneath the wings. During take-off and landing, i.e., low speed operation, the jet exhaust of an upper surface blowing aircraft attaches to the upper surface of the associated wing and flap, the flaps being in an extended state. The attached airflow creates a downward thrust component, and a slightly rearward thrust component, the magnitude of the components depending upon the actual extended state of the flaps and the degree of jet exhaust turning. The downward thrust component of the jet exhaust augments the normal aerodynamic lift provided by the wings and, thus, allows an upper surface blowing aircraft to take off and land in relatively short instances. During high speed (cruise) operation, the flaps of an upper surface blowing aircraft are retracted and little or no flow attachment to the wings and retracted flaps occurs. Thus, during cruise the jet exhaust flows directly rearwardly, but still over the wing and flap surfaces.

One of the difficulties with upper surface blowing type aircraft relates to the attachment of the jet exhaust to the wing and flap surfaces during low speed operation. More specifically, the jet exhaust attachment occurs in accordance with what is known as the Coanda effect. The Coanda effect is defined as the tendency of a gas or fluid stream to follow a curved surface. This effect naturally occurs if the radius of curvature, the thickness of the stream and the negative pressure normally occurring on the side of the stream adjacent to the curved surface fall within certain interrelated boundaries. That is, the thickness of the stream that will turn about a predetermined radius of curvature is determined by the amount of negative pressure normally occurring on the side of the stream adjacent to the surface forming the radius of curvature. If all of the parameters do not fall within their interrelated boundaries the stream detaches or separates from the wing and flap surface. The problem, thus, is insuring that attachment takes place when desired because if the jet exhaust stream does not attach or becomes partially or fully detached the beneficial aspects of the Coanda effect are partially or fully lost. When the Coanda effect is lost, both the lift due to jet deflection and the increased aerodynamic lift of the aircraft due to upper surface blowing is decreased.

Therefore, it is the object of this invention to provide a method of enhancing the attachment of a jet stream to a wing and flap upper surface and increasing the jet stream turning effectiveness.

It is also an object of this invention to provide a method of enhancing the attachment of the jet exhaust generated by a jet engine mounted above the wing of an aircraft to the wing and associated flap upper surface of the aircraft.

It is also an object of this invention to provide a method of an an apparatus for improving Coanda flow attachment to the wing and flap surface of an upper surface blowing aircraft.

SUMMARY OF THE INVENTION

In accordance with the principles of this invention a method of enhancing Coanda flow attachment to the wing and flap surface of an upper surface blowing aircraft is provided. The method comprises the step of directing the exhaust stream of a jet engine, mounted so that the jet exhausts over the wing and flap surface, toward regions wherein ambient air causes the exhaust stream to separate from the wing and flap surface. The thusly directed exhaust stream has an outward velocity component that prevents the ambient air from flowing in from the sides of the exhaust stream and causing separation.

In accordance with other principles of this invention, the method also comprises the step of creating vortices having outward velocity components. The vortices also flow toward the separation regions and their velocity components increase the overall sidewise (outward) velocity component. The rotational velocity components of the vortices also scrub the boundary layer air from flap surface to futher promote flow attachment.

In accordance with further principles of this invention, apparatus for carrying out the method of the invention is provided. The apparatus comprises one or more vortex generating vanes located between the engine exhaust and the trailing edge of the flap. The vortex generating vanes are movable about vertical axes. The vortex generating vanes are airfoil shaped in cross-section, when viewed from the top, and are adapted to both direct the jet exhaust stream toward separation regions and create vortices having outward velocity components.

In accordance with further principles of this invention, the vortex generating vanes are located beyond the fifty percent chord point of the front to rear chord defined by the wing and associated flap. In addition, the height to chord length ratio of the airfoil shaped vortex generating vanes is approximately one-half. Finally, preferably, the height of the vortex generating vanes is four to eight times the boundary layer thickness occurring between the jet stream, and the surface of the wing and flap.

It will be appreciated from the foregoing summary that the invention comprises a method of and an apparatus for enhancing Coanda flow attachment of the jet exhaust stream flowing over an associated wing and flap surface of an upper surface blowing aircraft particularly during take-off and landing, i.e., low speed operation. Because the vortex generating vanes of the invention are movable, they can be aligned with the jet exhaust or folded against the wing surface during high speed (cruise) operation. Thus, attachment enhancement can be minimized during cruise operation where attachment is not desired and maximized during low speed operation where attachment is desired.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

This invention is directed to providing a method of and an apparatus for enhancing Coanda flow attachment over the wing and flap surface of an upper surface blowing aircraft. That is, it has been found that the jet exhaust stream flowing over an upper wing and flap surface of such an aircraft separates from the wing, and more particularly, the flap surfaces in some regions. For example, such flow tends to separate in the region adjacent to the fuselage, particularly when the jet engines are inboard (near the fuselage) engines rather than outboard (separated from the fuselage) engines. The separation is caused by ambient air flowing in from the sides of the jet exhaust stream. This separation region and other separation regions may be readily determined in wind tunnel tests using lamp black to depict wing flow patterns.

In accordance with the method of this invention, the already diverged, relatively thin, exhaust of the jet engine is directed toward the separation regions. The direction of the exhaust creates an outwardly velocity component which prevents ambient air from flowing in under the exhaust and causing separation. The method also comprises the step of creating vortices having outward velocity components which further increase the overall sidewise (outward) velocity component. The vortices also scrub the boundary layer air from the flap surface to further promote flow attachment.

Figure 1:
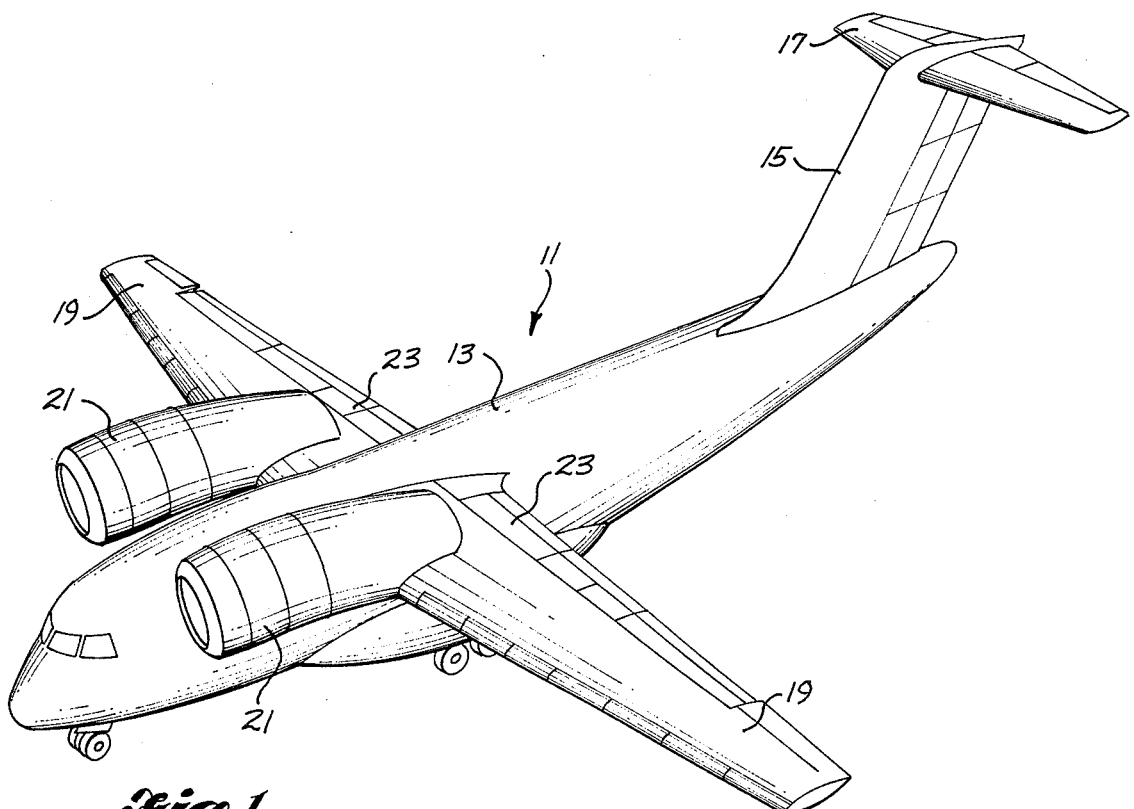
FIG. 1 is a perspective view of an upper surface blowing aircraft.

Turning now to the drawings wherein a preferred embodiment of an apparatus for carrying out the method of the invention is illustrated; FIG. 1 illustrates an upper surface blowing aircraft 11. The aircraft 11 illustrated in FIG. 1 comprises a fuselage 13; a vertical stabilizer 15; a horizontal stabilizer 17; wings 19; and, engine 21 mounted above the wings 19 on either side of the fuselage 13. The jet engines 21 emit exhaust streams that flow over the wings 21 and upper surface blowing (USB) flaps 23 forming the rear portion of the wings. During high speed (cruise) operation the flaps are retracted or withdrawn in a standard manner. In addition, during such operation, the exhaust stream is relatively thick. Because it is thick, the jet exhaust stream does not adhere to the upper surface of the wing and flap (or only minimally adheres thereto). During low speed operation, the flaps are extended downwardly and the exhaust stream is thinned by means not shown. The thinned stream adheres to the now downwardly extended flaps in accordance with the Coanda effect. Because the flaps are extended downwardly, the adhering jet exhaust provides downward and rearward thrust vectors. The downward thrust vector creates lift that augments the normal aerodynamic lift effect of the wings 21.

Figure 2:
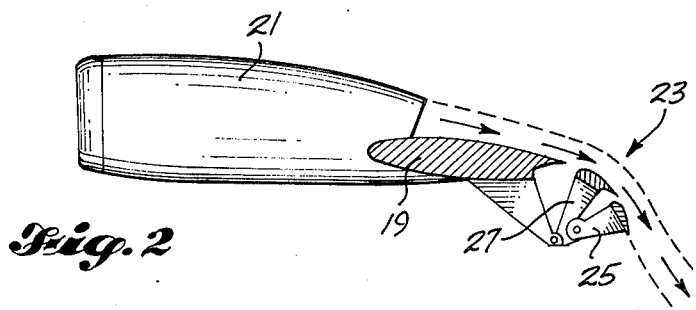
FIG. 2 is a side view of an engine, wing and flap arrangement suitable for use by an upper surface blowing aircraft of the type illustrated in FIG. 1.

FIG. 2 illustrates one of the engines 21 mounted above one of the wings 19. In addition, one of the flaps 23 is illustrated. The flap preferably comprises two sections 25 and 27. The sections are movable between retracted and extended positions. In FIG. 2 they are illustrated in the extended position wherein they create a radius of curvature that angles rearwardly and downwardly. When the jet exhaust stream follows this radius of curvature, it creates rearward and downward thrust vectors.

Figure 3:
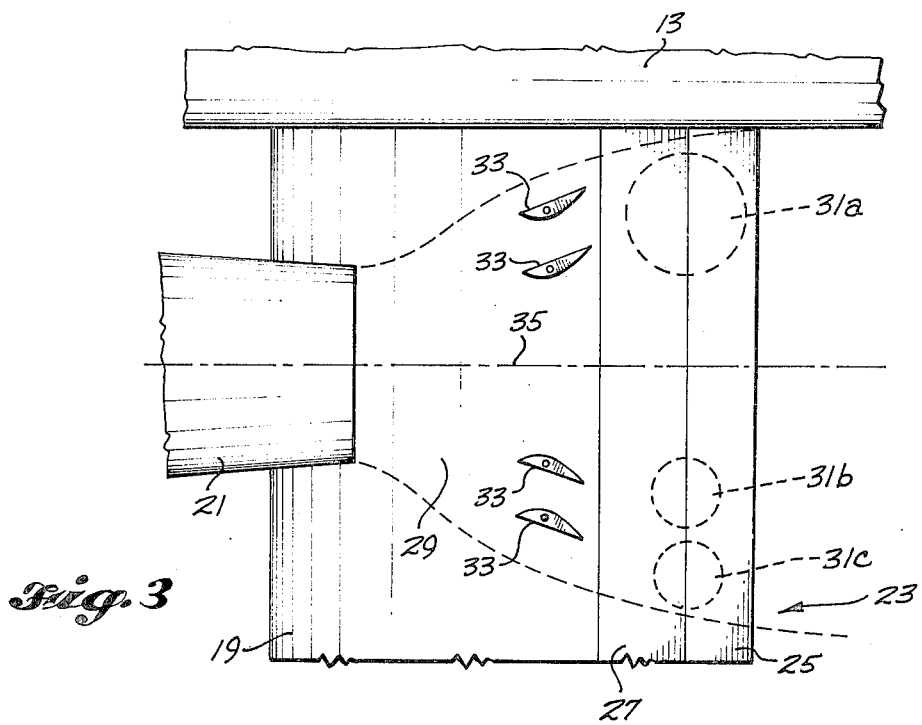
FIG. 3 is a top view of a portion of the engine, wing and flap elements of an upper surface blowing aircraft and includes an illustration of a preferred embodiment of the apparatus of the invention.

FIG. 3 illustrates a portion of the fuselage 13, a portion of one of the wings 19 and a portion of one of the jet engines 21. In addition, a portion of the flap 23 including its two sections 25 and 27 are illustrated. The jet exhaust from the engine 21 is illustrated as diverged, such divergence being created by a suitable diverging means, not shown. The diverged jet exhaust 29 is relatively thin and passes over the upper surface of the wing 19 and the flap 23 and, thence, downwardly and rearwardly. It has been observed in wind tunnel tests that the diverged jet exhaust will separate from the wing/flap surface, mainly over the flap, such separation being caused by ambient air flowing in from the sides of the diverged jet exhaust stream. These regions 31a through 31c are depicted in FIG. 3 by dashed lines. One primary region 31a where such separation occurs is adjacent the fuselage 13. In any event, such separation causes a loss of the downward thrust vector and, thus, a loss of lift and turning effectiveness. As discussed above, the invention is directed to overcoming this problem.

The method of the invention comprises directing a part of the jet exhaust stream 29 toward the separation regions 31a through 31c to create outward velocity components. The outward velocity components prevent ambient air from flowing in from the sides of the exhaust stream and causing the undesired separation. In addition, vortices having an outward velocity component also are created. The apparatus of the invention carries out the method of the invention by locating a plurality of movable vortex generating vanes 33 on either side of the centerline 35 of the engine 21 in the thin jet stream 29. The vortex generating vanes are rotatably movable about vertical axes whereby they can be adjusted to direct the jet exhaust stream toward the separation regions 31a through 31c, as necessary. While the vortex generating vanes are illustrated as lying in a row along a line lying at right angles to the centerline defined by the jet engine, they can be located in a non-row array, if desired.

As will be better understood from the following description of the vortex generator illustrated in FIGS. 4 through 7, the vortex generating vanes are aerodynamic in cross-section when viewed from above. The high pressure sides of the aerodynamically shaped vortex generating vanes face toward the outside of the exhaust stream 29 and the low pressure sides face toward the center of the stream. Preferably, the vortex generating vanes are located beyond (to the rear of) the 50 percent chord point running from front to rear of the chord defined by the wing and retracted flap. However, if desired, the vortex generating vanes can be located in front of this point.

As stated above, the vortex generating vanes 33 are rotatable about vertical axes. They are moved about their axes by any suitable mechanical, electromechanical, pneumatic, hydraulic, etc., means (not shown) so as to direct the thin exhaust stream, during low speed operation, toward the separation regions. During high speed operation, the vortex generating vanes are aligned with the then thick exhaust stream or folded against the wing (by means not shown) to provide little or not flow attachment enhancing effect. In addition to their directional function, the vortex generating vanes also create vortices having outward velocity components. In addition to adding to the outward velocity components created by "directing" the exhaust stream, the vortices also scrub the boundary layer air from the wing and flap surface. Scrubbing of the boundary layer air further promotes flow attachment and, thus, further enhances lift and increases turning effectiveness.

Figures 4, 5:
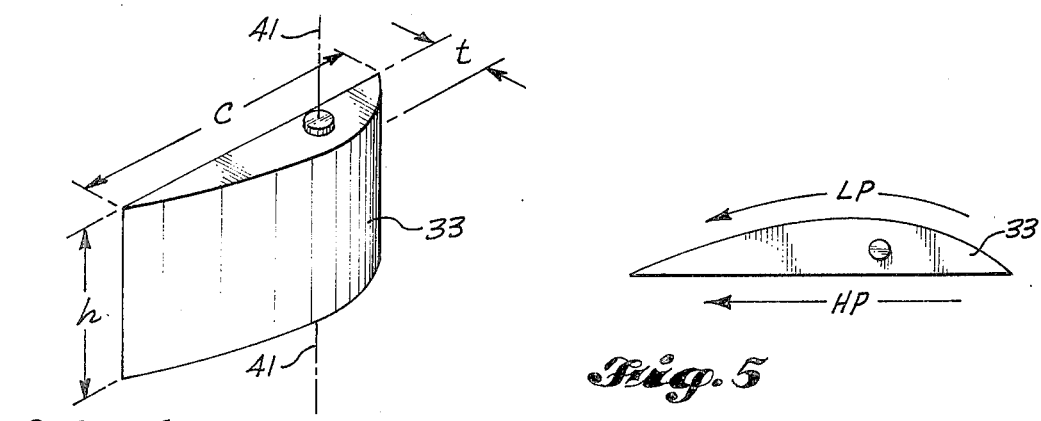
FIG. 4 is a perspective view of a vortex generating vane suitable for directing a jet exhaust stream and creating vortices all in accordance with the invention.
FIG. 5 is a top view of a vortex generating vane of the type illustrated in FIG. 4.
Figures 6, 7:
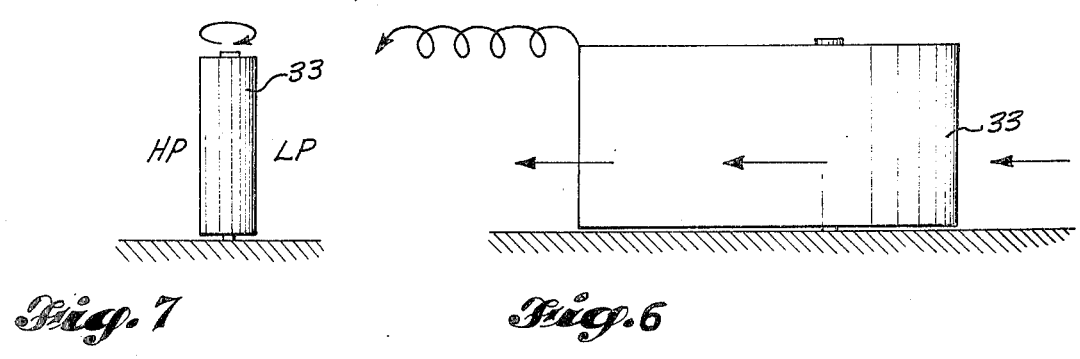
FIG. 6 is a side view of a vortex generating vane of the type illustrated in FIG. 4 and illustrates the generation of a vortex; and, FIG. 7 is a rear view of a vortex generating vane of the type illustrated in FIG. 4 and further illustrates the generation of a vortex.

FIGS. 4 through 7 illustrate a preferred embodiment of vortex generating vanes formed in accordance with the invention. As illustrated in FIGS. 4 and 5, such vortex generating vanes are aerodynamically shaped. Preferably, one side is relatively flat. This side is the high pressure (HP) side. The other side is curved and is the low pressure (LP) side. A longitudinal vertical axis 41 passes generally through the mass center of the vortex generating vanes 33. It is about this axis that the vortex generating vanes 33 are preferably rotated, even though other axes of rotation can be utilized, if desired. While different sizes and shapes of vortex generating vanes can be utilized by the invention, through experimentation it has been found that, preferably, the height ($h$) of the vortex generating vanes should be four to eight times the boundary layer thickness. Moreover, the height ($h$) to chord length ($c$) ratio is preferably one-half. Further, the preferred thickness ($t$) is 0.08 times the chord length ($c$).

As the jet stream passes the thusly formed vortex generating vanes, vortices are automatically created by the air on the high pressure (HP) side attempting to move to the low pressure (LP) side over the top of the vortex generating vanes. On one side of the engine centerline, these vortices are counterclockwise (when viewed from the rear) and on the other side of the centerline the vortices are clockwise (also when viewed from the rear). Thus, the vortex generating vanes create outward velocity components. These outward velocity components aid the directionally created outward velocity components and, also, scrub the boundary layer from the upper surface of the portion of the wing and flap surface located to the rear of the vortex generating vanes.

It will be appreciated from the foregoing description that the invention provides a method of and an apparatus for enhancing Coanda flow attachment in an upper surface blowing aircraft. The method of the invention comprises the step of directing the jet exhaust stream of the engines of an upper surface blowing aricraft toward separation regions. In addition, the method comprises the step of creating vortices which are also directed toward the separation regions. The apparatus of the invention comprises aerodynamically shaped vortex generating vanes located, preferably, well beyond the exhuast nozzle of the associated jet engine. The vortex generating vanes are rotatably movable about vertical axes and, thus, adapted to direct the jet exhaust stream toward separation regions. In addition, the vortex generating vanes create the vortices which scrub the upper surface of the wing and associated flap.

It will be appreciated by those skilled in the art and others that various changes can be made in the preferred embodiment of the invention described herein without departing from the spirit and scope of the invention. Hence, the invention can be practiced otherwise than as specifically described herein.

Embodiments of the invention which exclusive property or privilege is claimed are defined as follows:

1. A method of providing enhanced Coanda flow attachment to the upper wing and flap surface of an upper surface blowing aircraft wherein a jet engine exhaust stream passes over said upper wing and flap surface, said method comprising the steps of:
   vertically thinning said jet exhaust stream, prior to said exhaust stream passing over said upper wing and flap surface in a manner such that a downward thrust component, adapted to augment the aerodynamic lift of said wing, occurs when the flap portion of said wing is extended; and,
   directing, from points on said wing and flap surface located substantially downstream from the region whereat said vertically thinned jet exhaust stream is thinned, said thinned exhaust stream spanwise across said wing and flap surface toward regions whereat said thinned exhaust stream tends to separate from said wing and flap surface when said flap is extended, so as to create outward velocity components that prevent ambient air from flowing in under the thinned exhaust stream from the sides of the thinned exhaust stream.

2. The method claimed in claim 1 comprising the further step of creating vortices, at said points on said wing and flap surface located substantially downstream from the region whereat said vertically thinned jet exhaust stream is thinned, and directing said vortices toward said separation regions, said vortices having outward velocity components which add to the outward velocity components created by directing said thinned exhaust stream toward said separation regions, said vortices being generated in a manner such that they scrub boundary layer air from the wing and flap surface.

3. In an upper surface blowing type aircraft wherein the exhaust stream of a jet engine is vertically thinned when a flap of an associated wing and flap structure is extended, and the thinned exhaust stream is directed to flow over said wing and flap surface, said thinned exhaust stream adhering to said wing and flap surface when said flap is so extended in a manner such that a downward thrust component, adapted to augment the aerodynamic lift of said wing, occurs when said flap is extended, the improvement comprising horizontal, spanwise directing means, mounted in said thinned exhaust stream and on said wing and flap surface substantially downstream of the region whereat said thinned exhaust stream is thinned for horizontally directing a portion of said thinned exhaust stream spanwise toward regions whereat said thinned exhaust stream tends to separate from said wing and flap surface.

4. The improvement claimed in claim 3 wherein said directing means is rotationally movable about a generally vertical axis between a position whereat said directing means directs said portion of said thinned exhaust stream toward said separation regions and a position whereat said directing means has little directive effect on said exhaust stream.

5. The improvement claimed in claim 4 wherein said directing means is generally aligned with the longitudinal axis defined by said jet exhaust stream when in said position having little directive effect on said exhaust stream.

6. The improvement claimed in claim 3 wherein said directing means comprises at least one vortex generating vane.

7. The improvement claimed in claim 6 wherein said at least one vortex generating vane is aerodynamically shaped so as to have a high pressure side and a low pressure side, said high pressure side facing away from the longitudinal axis defined by said exhaust stream and said low pressure side facing said longitudinal axis defined by said exhaust stream.

8. The improvement claimed in claim 6 wherein said directing means comprises a plurality of vortex generating vanes arrayed in a predetermined manner in said exhaust stream.

9. The improvement claimed in claim 8 wherein said plurality of vortex generating means define a line lying generally at right angles to the longitudinal axis defined by said exhaust stream.

10. The improvement claimed in claim 9 wherein said vortex generating vanes are aerodynamically shaped so as to have low pressure sides and high pressure sides, said high pressure sides facing away form the longitudinal axis defined by said exhaust stream, and said low pressure sides facing toward said longitudinal axis defined by said exhaust stream.

11. The improvement claimed in claim 7 wherein said at least one vortex generating vane has a height above the surface of said wing and flap surface that lies in the range of from four to eight times the boundary layer thickness existing between said jet exhaust stream and said wing and flap surface.

12. The improvement claimed in claim 11, wherein the height-to-chord length ratio of said at least one vortex generating vane is 1/2 and wherein the maximum thickness of said at least one vortex generating vane between its high and low pressure sides is substantially .08 times its chord length.

13. The improvement claimed in claim 10 wherein said pluarlity of vortex generating vanes each have a height above the surface of said wing and flap surface that lies in the range of from four to eight times the boundary layer thickness existing between said jet exhaust stream and said wing and flap surface.

14. The improvement as claimed in claim 13 wherein the height-to-chord length ratio of each of said plurality of vortex generating vanes is ½ wherein the maximum thickness of each of said plurality of vortex generating vanes between their associated high and low pressure sides is substantially 0.08 times their chord length.

* * * * *